United States Patent Office
2,774,761
Patented Dec. 18, 1956

2,774,761
PREPARATION OF SULFURIC ACID HALF ESTERS OF LEUCO VAT DYES

William Baptist Hardy, Bound Brook, N. J., assignor to American Cyanamid Company, New York, N. Y., a corporation of Maine No Drawing. Application September 1, 1953, Serial No. 377,980

13 Claims. (Cl. 260—274)

This invention relates to an improvement in the preparation of sulfuric acid half esters of leuco vat dyes.

Sulfuric acid half esters of leuco vat dyestuffs have achieved large commercial usefulness, particularly in the dyeing of alkali-sensitive materials. The general procedure for the preparation of the sulfuric acid half esters involves the reduction of a vat dye with a suitable metal and esterification with sulfur trioxide addition products of tertiary heterocyclic amines, such as pyridine, in substantially anhydrous medium. This process, using pyridine, is expensive and the losses of pyridine frequently run as high as 15%. Pyridine has been in scarce supply for a long period of time and attempts to replace pyridine by cheaper tertiary bases have so far proven unsuccessful.

According to the present invention, I have discovered that a sulfur trioxide addition product of a dialkylcyanamide of the formula:

in which $R_1$ and $R_2$ represent alkyl groups of less than 4 carbon atoms, can be very successfully used to form the sulfuric acid half esters of leuco vat dyes. Dialkylcyanamides found useful in the present invention thus include dimethyl-, diethyl-, dipropyl-, diisopropyl-, and diallycyanamide. These lower dialklycyanamides are cheap and are readily available compounds.

The cyanamides are not usually considered bases. Although they have what appears to be an amino group, this is directly attached to a cyano group. The result is that cyanamide itself, $NH_2CN$, is acidic and readily forms salts by displacement of the hydrogen. It is, therefore, most surprising to find that the lower dialkylcyanamides can be used so effectively in conjunction with chlorosulfonic acid to form the sulfuric acid half esters of leuco vat dyes. The lower dialkylcyanamides, in spite of their low basicity, appear to form a sufficiently stable sulfur trioxide addition compound to permit the necessary esterification to take place.

In carrying out the present invention, a lower dialkylcyanamide is preferably reacted with chlorosulfonic acid to form the sulfur trioxide addition product, a vat dye and a metal in a finely-divided state are then added and reduction and esterification take place in situ at moderate temperature. The product may thereafter be recovered in the conventional manner, i. e., drowning in an alkaline solution, evaporating the dialkylcyanamide, filtering insoluble material and salting out the product.

The metals which can be used to reduce vat dyes in this process include the metals of group II–B of the periodic table having an atomic number less than 50, such as zinc and cadmium, as well as the metals of group VIII of the periodic table having an atomic number less than 30, such as iron.

The temperature of the reaction is quite moderate. Temperatures of the order of 40–50° C. have been found to be quite adequate for reaction. The temperature must be kept below a point at which the leuco ester being formed becomes unstable. This may vary among dyes but in general this is over about 60° C.

The invention will be described in greater detail in conjunction with the following specific examples in which the parts are by weight unless otherwise specified.

Example 1

Six parts of chlorosulfonic acid is added gradually to 30 parts of dimethylcyanamide at 10–15° C. The mixture is allowed to warm up to 30° C., and 1.7 parts of the dyestuff of the formula:

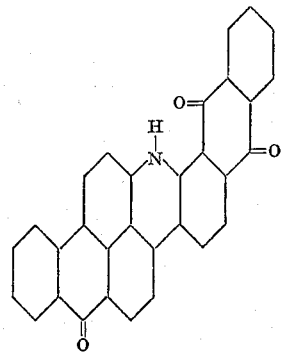

is added, followed by gradual addition of 2 parts of finely-divided iron. During this addition, an atmosphere of nitrogen is maintained above the reaction mixture. The mixture is allowed to stir at room temperature until the reaction is substantially complete. It is then drowned in a solution of 17 parts of sodium carbonate in 400 parts of water. The mixture is evaporated under reduced pressure to remove the dimethylcyanamide. It is then diluted and clarified by filtration. The filtrate is salted to 20% by weight with sodium chloride at 60° C. The mixture is then cooled to 15° C. with stirring, and the product is isolated by filtration. The product is the sulfuric acid half ester of the leuco form of the vat dye of the above formula.

Example 2

The procedure of Example 1 is followed, using 2.15 parts of the dye of the formula:

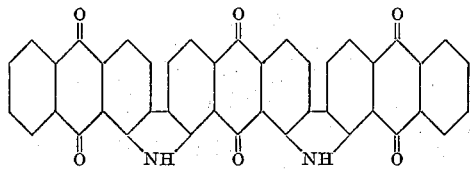

instead of the dye used in that example. The leuco sulfuric acid half ester of the dyestuff of the above formula is obtained.

Example 3

Six parts of chlorosulfonic acid is added gradually to 30 parts of dimethylcyanamide at 10–15° C. Five and eight-tenths parts of the dyestuff of the formula:

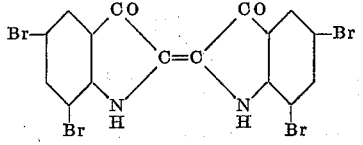

is added. The mixture is then stirred under nitrogen while 2 parts of finely-divided iron is added gradually below 40° C. The mixture is allowed to stir at room temperature until the reaction is substantially complete. It is then drowned in a solution of 17 parts of sodium carbonate in 400 parts of water. The resultant slurry is concentrated under reduced pressure to remove the dimethylcyanamide. The residual liquor, about 800 parts by volume, is filtered at 60° C. The filtrate is evaporated under reduced pressure to about 400 parts by volume, and 70 parts of sodium chloride are added at 60° C. The precipitated product is filtered and washed with 10% brine solution. The product is the disulfuric ester of the tetrabromoindigo of the above formula.

*Example 4*

The procedure of Example 3 is followed, replacing the dye of that example with 3.8 parts of the dye of the formula:

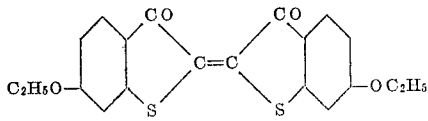

It was found necessary to add an additional 15 parts of dimethylcyanamide in order to maintain a stirrable slurry. The product was isolated in the same manner as in Example 3, yielding the leuco sulfuric acid half ester of the above dyestuff.

*Example 5*

Six parts of chlorosulfonic acid is added gradually to 30 parts of diethylcyanamide. Four and five-tenths parts of the dye of the formula:

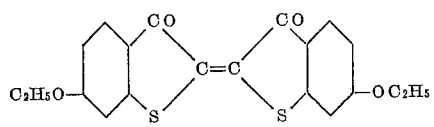

is then added. The mixture is stirred in a nitrogen atmosphere while 2 parts of copper powder is added, followed by 10 additional parts of diethylcyanamide. The mixture is allowed to stir at room temperature for some time, after which it is drowned in a solution of 17 parts of sodium carbonate in 150 parts of water. The drowned mixture is heated to 65° C. and filtered. The cake is washed with hot water and then reslurried in 100 parts by volume of 2% sodium hydroxide at 70° C. This slurry is again filtered, and the filtrate is combined with the original filtrate. This solution is salted with 100 parts of sodium chloride, a concentration of about 25% being attained. Filtration yields the sulfuric acid half ester of the leuco form of the vat dye of the above formula.

*Example 6*

The procedure of Example 1 is followed substituting diisopropylcyanamide for the dimethylcyanamide used therein. The same product is obtained.

I claim:

1. The process of preparating sulfuric acid half esters of leuco vat dyes which comprises subjecting a vat dye to treatment with a metal selected from the class consisting of metals of group II–B of the periodic table having an atomic number less than 50 and metals of group VIII of the periodic table having an atomic number less than 30, and with a sulfur trioxide addition product of a dialkylcyanamide of the formula:

in which $R_1$ and $R_2$ represent alkyl groups of less than 4 carbon atoms.

2. The process according to claim 1 in which the sulfur trioxide addition product is formed by the addition of chlorosulfonic acid to the dialkylcyanamide.

3. The process according to claim 1 in which the dialkylcyanamide is dimethylcyanamide.

4. The process according to claim 1 in which the vat dye has the formula:

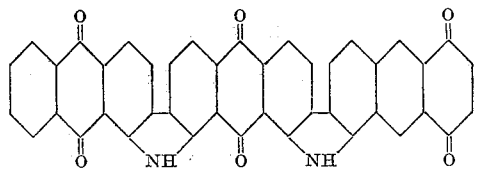

5. The process according to claim 4 in which the dialkylcyanamide is dimethylcyanamide and the metal is iron.

6. The process according to claim 1 in which the metal is iron.

7. The process according to claim 1 in which the vat dye is a thioindigo compound.

8. The process according to claim 7 in which the thioindigo dye has the formula:

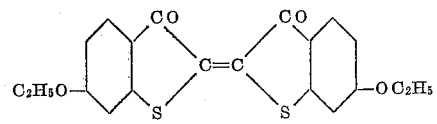

9. The process according to claim 8 in which the dialkylcyanamide is dimethylcyanamide and the metal is iron.

10. The process according to claim 1 in which the vat dye has the formula:

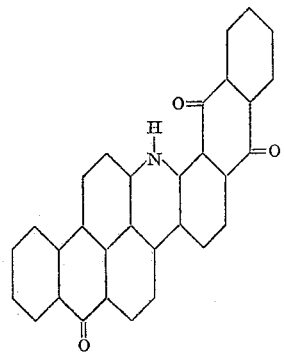

11. The process according to claim 10 in which the dialkylcyanamide is dimethylcyanamide and the metal is iron.

12. The process according to claim 1 in which the vat dye has the formula:

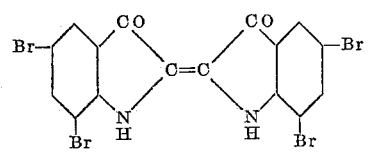

13. The process according to claim 12 in which the dialkylcyanamide is dimethylcyanamide and the metal is iron.

References Cited in the file of this patent

UNITED STATES PATENTS

| | | |
|---|---|---|
| 1,784,379 | Munch | Dec. 9, 1930 |
| 2,403,226 | Lecher et al. | July 2, 1946 |
| 2,506,580 | Coffey et al. | May 9, 1950 |
| 2,563,819 | Coffey et al. | Aug. 14, 1951 |
| 2,648,484 | Hardy | Aug. 18, 1953 |